J. LINDGREN & O. A. MATTSON.
MILK COOLER.
APPLICATION FILED MAR. 13, 1909.
933,653.
Patented Sept. 7, 1909.
2 SHEETS—SHEET 1.
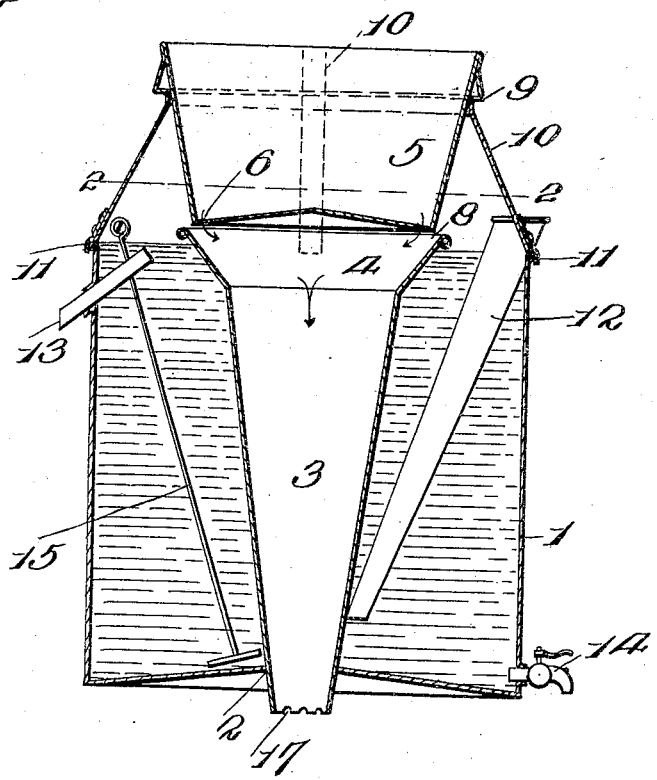
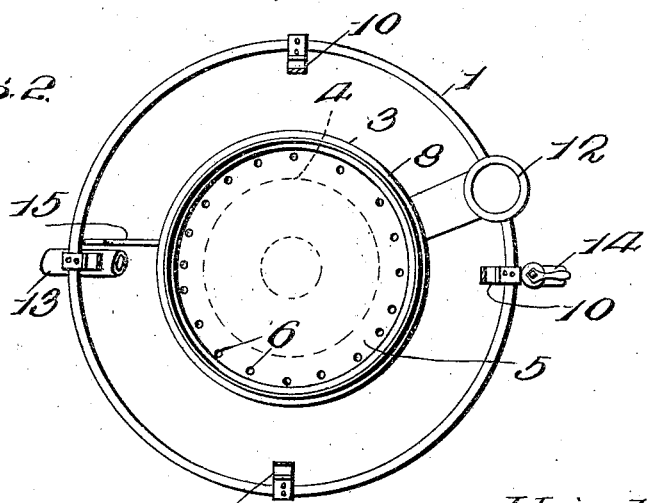
Witnesses
Floyd Cornwall
John Conners
Inventors
J. Lindgren
O. A. Mattson
By
Attorney J. LINDGREN & O. A. MATTSON.
MILK COOLER.
APPLICATION FILED MAR. 13, 1909.
933,653.
Patented Sept. 7, 1909.
2 SHEETS—SHEET 2.
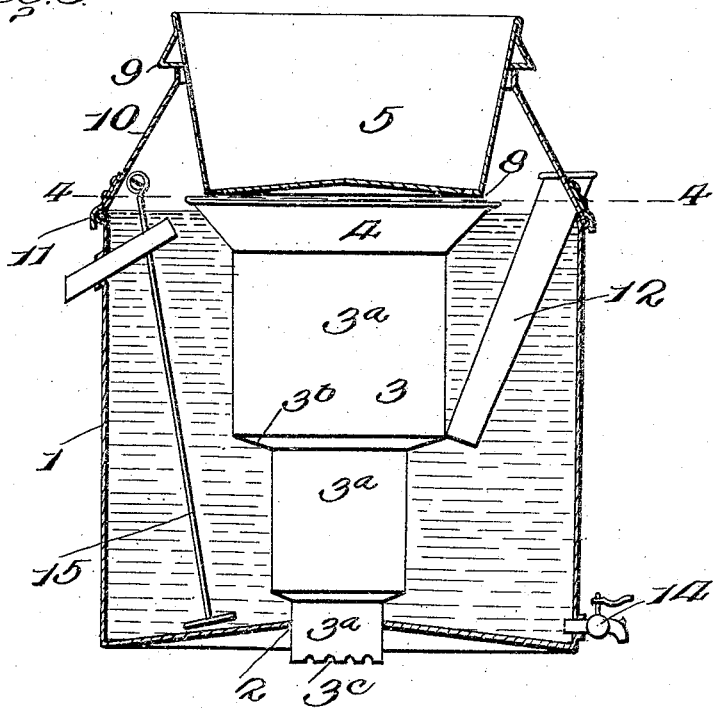
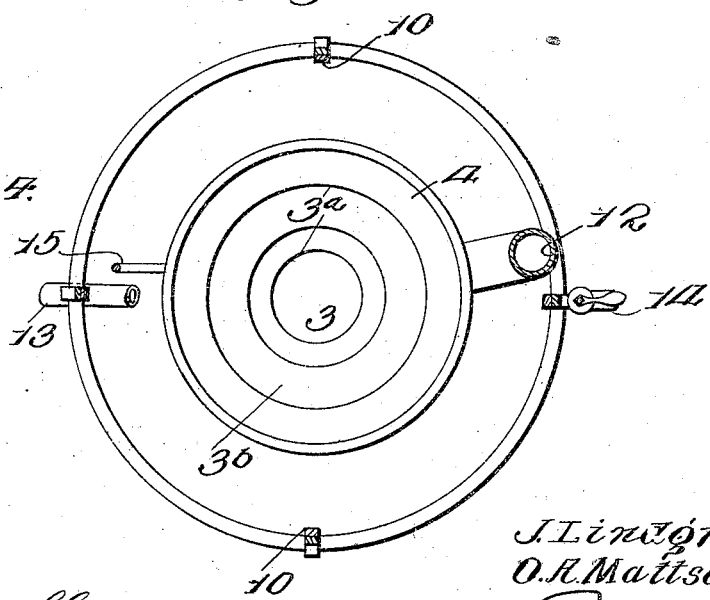
Witnesses
Inventors
J. Lindgren.
O. A. Mattson.
By
Attorney

UNITED STATES PATENT OFFICE.

JOSEPH LINDGREN AND OSCAR A. MATTSON, OF MOUNT VERNON, WASHINGTON.

MILK-COOLER.

933,653.

Specification of Letters Patent.

Patented Sept. 7, 1909.

Application filed March 13, 1909. Serial No. 483,138.

*To all whom it may concern:*

Be it known that we, JOSEPH LINDGREN and OSCAR A. MATTSON, citizens of the United States, residing at Mount Vernon, in the county of Skagit and State of Washington, have invented certain new and useful Improvements in Milk-Coolers, of which the following is a specification.

This invention relates to improvements in milk coolers.

The object of the invention is to provide an inner receptacle, or passage way for the milk, the latter being cooled by water surrounding the receptacle, combined with the air ascending through the passageway; the milk thereby being subjected to two cooling agencies.

A further object of the invention is to provide means for causing a somewhat spraying action of the milk on the inside of the passageway to make the milk more readily subject to the cooling effect.

A further object of the invention is to provide means for the escape of the warm air due to the cooling of the milk.

The invention also relates to the specific details of construction and arrangement of parts, which will be hereinafter described, and particularly pointed out in the claims.

In the drawings—Figure 1, is a vertical section. Fig. 2, is a horizontal section. Fig. 3, is a view similar to Fig. 2, showing a slight modification. Fig. 4, is a horizontal section of the same.

The numeral 1, indicates a tank provided with a centrally disposed opening 2, in which fits a funnel or tube 3, which tapers upwardly, and is outwardly flared at its upper end as shown at 4. This tube is open at its upper and lower ends, and is surrounded with water contained in the tank 1, which acts as a cooling agent.

Suspended over the flared upper end 4, of the tube 3, is a milk receiving pan 5, the bottom of which inclines toward the outer edge, and is formed with a series of perforations 6, for the passage of the milk onto the flared portion 4, of the tube 3. The diameter of the lower end of the pan 5, is less than the diameter of the upper end of the tube 3, and is spaced therefrom, to form an exit 8, for the draft of air passing through the tube to carry off the heat from the milk while the latter is being cooled. The pan 5, is provided with lugs 9, under which fit the upper ends of legs 10, the lower ends being bifurcated at 11, to fit over the upper edge of the tank 1. The tank is provided with an inlet tube 12, and an overflow pipe 13, and at its lower portion with a draw off cock 14. Fitting in the tank is a stirring device 15, designed to agitate the water to obtain the best cooling effect.

In Figs. 3 and 4, is shown a slightly different form of the tube 3, which consists of a series of varying diameters which gives increased area for the passage of the milk from the pan 5, to the exit of the tube. The tube 3, by the varying diameters $3^a$, form a series of shelves $3^b$, which incline toward the center to permit of the gradual flowing of the milk in its descent to the open end $3^c$.

In operation, the tank 1, is filled with water through the tube 12, (which may be continuous) and the milk is placed in the pan 5, and passes through the openings 6, in the bottom thereof in small streams on to the flared portion 4, of the tube 3, thereby flowing along the inner wall of the latter in a thin sheet or column to the exit 17, into a receptacle placed under the apparatus. The water surrounding the tube 3, cools the milk in its passage, and in addition thereto a current of air passes through opening 17, and tube 3, which acts on the inside wall of the column of the milk to cool it, the air, and the heat from the milk, which has been extracted from the milk, passing through the passage 8, to the tank on the outside, and is also cooled by the passage of the current of air on the inside of the column of milk, which produces a very beneficial and important cooling effect on the milk at a greatly reduced cost.

What we claim is—

1. In combination, a tank for receiving a cooling agent, an inner tube having its upper and lower ends open and surrounded by the cooling agent in the tank, means for supplying milk to the inner walls of the tube, said means being spaced from the tube to provide an exit for the passage of the air through the volume of milk flowing from the supply means and through the column of milk being cooled, the passage of the air, and the cooling agent in the tank, serving as a means to cool the milk.

2. In a milk cooler, the combination with a tank to contain a cooling agent, a tube having a flared portion and open at its upper and lower ends and fitting in the tank, a pan formed with openings in its bottom said openings being located over the flared portion of the tube, for the milk to drop thereon means supporting the pan above and slightly spaced from the flared portion of the tube to form an air passage, the milk being cooled passing in a thin sheet on the inside of the flared portion and down on the inside of the tank and the lower open end of the tube permitting air to pass through the column of milk and through the volume of milk dropping from the pan and out through the space to the atmosphere.

3. In a milk cooler, the combination with a tank to contain a cooling agent, a milk tube larger at its upper end than at its lower end and located within the tank and open at its upper and lower ends, said tank being outwardly flared at its upper end and formed with varying reduced portions toward its bottom, a milk supplying pan formed with openings in its bottom the openings being located above and spaced from the flared end of the milk tube, the open ends of the milk tube permitting of a current of air to pass therethrough to cool the milk therein.

4. In a milk cooler, the combination with a tank to contain a cooling agent and having a tube therein which is flared at its upper end and also open at its lower end, the lower end of the said receptacle being smaller in area than the upper end, a pan above the receptacle and having openings in its bottom said openings being located over the flared upper end of the tube, and means for spacing the pan from the receptacle, the open upper and lower ends of the receptacle permitting of the passage of a current of air from the atmosphere to the tube through the receptacle.

In testimony whereof we affix our signatures in presence of two witnesses.

JOSEPH LINDGREN.
OSCAR A. MATTSON.

Witnesses:
J. P. HOUSER,
GERTRUDE GAGE.